United States Patent Office 3,321,269
Patented May 23, 1967

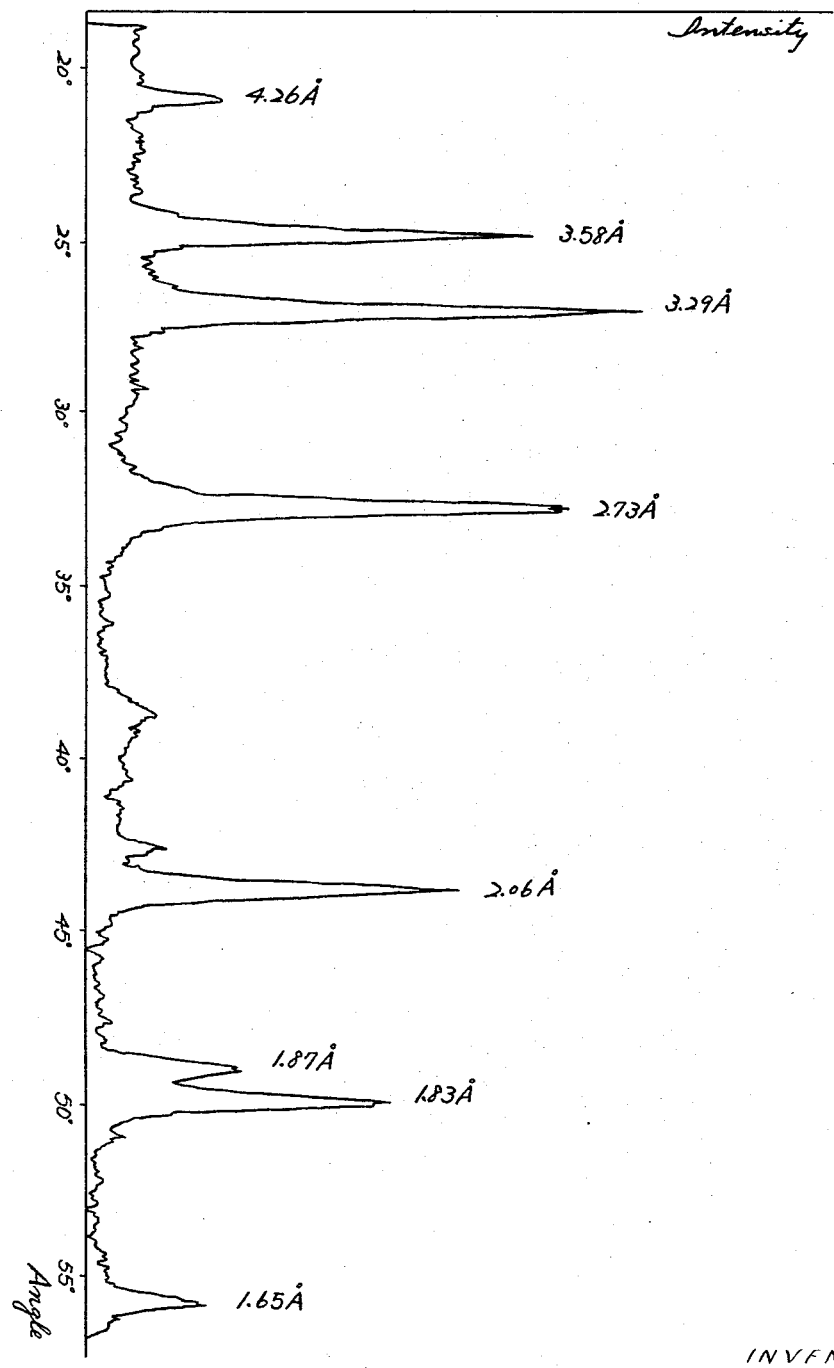

3,321,269
PROCESS FOR THE PRODUCTION OF CRYSTALLINE CALCIUM CARBONATE OF VATERITE TYPE
Eizo Yasui, Shichiro Shoda, Hiroshi Suzuki, and Hiroshi Yamada, all of Nagoya-shi, Japan, assignors to Toa Gosei Kagaku Kogyo Kabushiki Kaisha, Tokyo, Japan
Filed July 7, 1964, Ser. No. 380,751
3 Claims. (Cl. 23—66)

This invention relates to a process for the production of crystalline calcium carbonate of the vaterite type having advantageous properties which are required in the manufacture of rubber, paper, plastics and in other fields.

Calcium carbonate finds wide applications in the manufacture of rubber, paper, plastics, paints, foodstuffs, cosmetics and medicines. However, crystalline structure, distribution of grain size, apparent density, dispersibility and surface activity of calcium carbonate used must vary considerably depending on the specific purpose to which it is applied.

The crystalline structure of calcium carbonate is of three types, namely calcite type (hexagonal system) which is found in calcite and egg shell; aragonite type (rhombic system) which is found in the aragonite and scallop shell; and vaterite type (pseudohexagonal system) which is found in an unstable, intermediate state.

Of these three, the calcite type of calcium carbonate is the most stable. The aragonite type of calcium carbonate as well as the vaterite type ultimately convert into the calcite type.

To obtain finely divided calcium carbonate, it is usual to mill grind naturally occurring lime stone. However, the finely divided calcium carbonate obtained in this way usually is of the calcite type and shows non-uniform grain size, a specific density of at least 0.6 and lower dispersibility. Additionally it contains many impurities. It is therefore unsuitable for use in the manufacture of rubber, paper and other processes, as mentioned above. The finely divided calcium carbonate may also be produced by other methods, one of which is carried out by blowing gaseous carbon dioxide obtained by calcination of lime stone into a purified milk of slaked lime. A further conventional method of producing a finely divided calcium carbonate consists of the reaction of calcium chloride with sodium carbonate in an aqueous reaction medium. However, all of the crystalline calcium carbonate obtained in the above-mentioned methods of the prior art is in the form of relatively coarse crystals of the calcite type. Calcium carbonate containing a large proportion of the vaterite type crystals is very difficult to produce. Although there is a report that crystalline calcium carbonate of the vaterite type may be formed by decomposing basic calcium carbonate in the presence of certain ions (refer to "Bull. Chem. Soc. Japan" 35, 1937 (1962)), it has been generally considered that the formation of calcium carbonate containing a large proportion of the vaterate type crystals could not be prepared commercially in view of the instability of the vaterite structure which might require an extremely large amount of energy under special conditions.

Thus, all of the prior art methods of producing calcium carbonate are directed exclusively to the formation of the calcite type calcium carbonate and no process for the production of the vaterite calcium carbonate has been developed. We have expected that from the standpoint of the crystalline structure, the vaterite calcium carbonate may have a higher surface-activity than the calcite and aragonite types and will show various advantages in the aforesaid applications if it may be obtained in a very pure, stable and finely divided state. We have performed experiments to improve our process for the production of finely divided and lighter calcium carbonate which comprises the carbonation of calcium chloride by introducing gaseous carbon dioxide into an aqueous solution of calcium chloride while maintaining the pH value of the solution in the range of alkalinity. In these experiments, we have now found that finely divided crystalline calcium carbonate of the vaterite type may be obtained at all times when gaseous carbon dioxide and/or ammonium carbonate is reacted with an aqueous solution of calcium chloride which has been made alkaline at a minimum pH value of 8 by the addition of ammonium hydroxide, while the reaction temperature is not permitted to exceed 20° C.

According to the invention, therefore, we provide a process for the production of crystalline calcium carbonate of the vaterite type which comprises reacting at least one of gaseous carbon dioxide and ammonium carbonate with an aqueous solution of calcium chloride which has been made alkaline at a minimum pH value of 8 by the addition of ammonium hydroxide, while the reaction temperature is maintained not higher than 20° C. and the reaction mixture is maintained alkaline at a minimum pH value of 8.

In the process of this invention, it is necessary to insure that the reaction solution in which the calcium carbonate is being formed is always maintained alkaline carbonate is being formed is always maintained alkaline at a pH value of 8 or higher. In order to prevent acidity in any localized portion of the reaction zone, it is generally desirable to have added to the calcium chloride solution ammonium hydroxide in a molar amount of at least twice as much as the quantity of calcium chloride present, to introduce gaseous carbon dioxide and/or ammonium carbonate into the reaction solution and to agitate the reaction mixture vigorously and continuously during the reaction. In the process of this invention, the alkalinity of the reaction zone must be maintained at a pH value of 8 or higher, and preferably higher than 8.2. If the pH value is in the range of from lower than 8 to 7, the yield of crystalline calcium carbonate contains the other types of crystals in addition to the desired vaterite type. If the pH value is lower than 7, the crystalline calcium carbonate which is obtained consists entirely of the calcite type of crystals.

The carbonation reagent which may be used to carry out the process of the invention is gaseous carbon dioxide and ammonium carbonate. The use of alkali metal carbonates such as sodium and potassium carbonates is excluded from the scope of the invention. If the carbonation reaction is carried out using an alkali metal carbonate, the resulting calcium carbonate product consists entirely of the calcite type of crystals and not the vaterite type which is the object of this invention.

Thus, the use of gaseous carbon dioxide and/or ammonium carbonate as the carbonation reagent is essential to the process of the invention in order to produce crystalline calcium carbonate of the vaterite type. In view of the purity and adjustment of grain size of the calcium carbonate crystals obtained, it is preferred to use gaseous carbon dioxide. The gaseous carbon dioxide which is used may be concentrated or diluted with an inert gas such as nitrogen. It is efficient to employ carbon dioxide under a suitable elevated pressure, the carbon dioxide having been diluted with an inert gas to a content of 10% or less. When the reactants are mixed with each other, namely when gaseous carbon dioxide or ammonium carbonate is reacted with the alkaline solution of calcium chloride, it is preferred to agitate the reaction mixture vigorously in order to obtain fine crystals of calcium carbonate. When gaseous carbon dioxide is used in the process of the invention, it is desirable to agitate the reaction mixture extremely vigorously in order to prevent the formation of localized acidity in the reaction zone.

The process of the invention should be carried out at a temperature of not higher than 20° C. and therefore proceeds much more slowly than the prior art methods and often needs a longer reaction time for the complete reaction of a single batch. However, if the process is carried out in such a way that the reaction is performed while the calcium carbonate crystals formed are continuously removed from the reaction system, the rate of the reaction may be increased without involving the formation of coarser crystals of calcium carbonate.

The process of the invention should be carried out at a temperature of not higher than 20° C. as stated above. If the reaction temperature exceeds 20° C., the crystalline structure of the calcium carbonate obtained may still be of the vaterite type, but the crystals are coarser and show a grain size of 10 microns or more. If the reaction temperature is much higher than 20° C., for example, at 45° C., the resulting crystalline calcium carbonate contains a mixture of the calcite type and the aragonite type of crystals. In general, the crystals of calcium carbonate obtained by the prior art methods, are likely to coagulate due to the secondary aggregation of the grains, unless they are treated by special methods to maintain the grain size below several microns. Therefore, crystalline calcium carbonate obtained by the prior art methods is usually of higher apparent density and unsuitable for use as a filler or the like. Nevertheless, finely divided crystalline calcium carbonate of the vaterite type and of a grain size of up to 5 microns may readily be obtained by the process of this invention.

Finely divided crystalline calcium carbonate of the vaterite type obtained by the process of the invention is of lower specific weight, higher dispersibility and higher surface-activity than those produced by the prior art methods. It may be used as filler for resin, paper, etc., with advantage.

The drawing shows a chart of the X-ray diffraction of crystalline calcium carbonate obtained by the process of the invention.

The invention will now be described with reference to a series of specific examples in which all the quantities of ammonium hydroxide used are given in mols. per mol. of calcium chloride present and the pressure is given in kg./cm.² absolute.

*Example 1*

An electro-magnetically stirred autoclave of a capacity of 5 l. is charged with 3 l. of an alkaline aqueous solution of 10% of calcium chloride which contains 2 mol. of ammonia per mol. of calcium chloride. Nitrogen gas is introduced into the reactor at a pressure of 5 kg./cm.². The charge is agitated at a stirring speed of 500 revolutions per minute and then gaseous carbon dioxide is blown into the charge under a partial pressure of less than 0.3 kg./cm.² while the temperature of the liquid is kept at 19° C. and the pH value of the reaction mixture is maintained above 8.4. After carbonation reaction takes place, crystals of deposited calcium carbonate are removed from the autoclave and washed with water until they are free from chloride ions. Drying at 100° C. for three hours gives a yield of 90% of crystalline calcium carbonate of the vaterite type of which properties are shown in the following Table 1:

TABLE 1

| Properties of product | | Note |
|---|---|---|
| Apparent density | 0.58 | |
| Structure of crystal | Vaterite type | Determined by X-ray diffractometry. |
| Grain size range | 3–5 microns, spherical | Determined by electron microscope. |

*Example 2*

An electro-magnetically stirred autoclave of a capacity of 3 l. is charged with 2 l. of an alkaline solution of 5% of calciumh chloride which has been obtained by double decomposition of slaked lime with ammonium chloride and which contains 2 mols. of ammonia per mol. of calcium chloride. Nitrogen gas is introduced into the reactor at a pressure of 3 kg./cm.². The charge is agitated at a stirring speed of 600 revolutions per minute and gaseous carbon dioxide is then blown into the charge under a partial pressure of less than 0.2 kg./cm.² while the pH value of the reaction mixture is maintained above 8.5 and the reaction temperature is kept at temperatures specified in Table 2. After the carbonation reaction takes place, the deposited reaction product is removed from the reactor and washed with distilled water until it is free from chloride ions. Drying at 100° C. for three hours gives crystalline calcium carbonate of the vaterite type of which the properties are shown in the following Table 2.

TABLE 2

| Reaction conditions and properties of product | 1st run | 2d run (comparative) | 3d run (comparative) |
|---|---|---|---|
| Reaction temperature | 18° C | 25° C | 35° C. |
| Yield of product | 90% | | 90%. |
| Apparent density | 0.64 | 0.73 | 0.89. |
| Structure of crystal | Vaterite | Vaterite | Vaterite. |
| Grain size range | 2–3 microns, spherical | 7–8 microns, spherical | 8–10 microns, spherical. |

The crystalline structure and average grain size of the crystals are determined by X-ray diffractometry and electron microscope, respectively.

*Example 3*

An electro-magnetically stirred 2 l. autoclave is charged with 1.2 l. of an alkaline aqueous solution of 5% of calcium chloride which contains 2 mols. of ammonia per mol. of calcium chloride. Nitrogen gas is introduced into the reactor so that a pressure of 2 kg./cm.² prevails therein. The charge is then agitated at a stirring speed of 750 revolutions per minute and the carbonation reaction is effected by blowing gaseous carbon dioxide into the charge under the partial pressures as mentioned hereinafter while the pH value of the reaction mixture is maintained above 8.6 and while the reaction temperature of the medium is kept at 11° C., 14° C. and 19° C., respectively.

The crystalline reaction product deposited is removed from the reactor and washed with water until it is free from chloride ions. Drying at 110° C. for three hours gives crystalline calcium carbonate of the vaterite type of which properties are shown in the following Table 3.

TABLE 3

| Reaction conditions and properties of product | 1st run | 2d run | 3d run |
|---|---|---|---|
| Reaction temperature, ° C | 11 | 14 | 19 |
| Nitrogen pressure in kg./cm.² | 2 | 2 | 8 |
| Partial pressure of carbon dioxide introduced, in kg./cm.² | <0.1 | <0.05 | <0.5 |
| Apparent density | 0.50 | 0.48 | 0.52 |
| Structure of crystal | (¹) | (¹) | (¹) |
| Grain size range, microns | 2–3 | 2–3 | 3–4 |

¹ Vaterite.

The structure of the crystals is determined by X-ray diffractometry, and it is found that crystalline calcium carbonate obtained when the reaction temperature is at 19° C. in this example is entirely of the vaterite type, as can be seen from the chart of X-ray diffraction shown in the attached drawing. The average grain size of the product is determined by electron microscope.

*Example 4*

Three-neck glass flasks of a capacity of one litre are charged with aqueous solutions of ammonium carbonate and of sodium carbonate, respectively. Both the solutions contain the carbonate in such a concentration that the content of carbonate ion is 4.9 grams per litre. The charge is then adjusted to a reaction temperature as specified in Table 4 below and 148 cc. of an alkaline aqueous solution of calcium chloride which was prepared by adding 4 cc. of 28% ammonia water to 144 cc. of an aqueous solution of 15% of calcium chloride is added at a rate of 7.5 cc. per minute. During the addition, the reaction mixture is agitated at a stirring speed of 180–200 revolutions per minute. The reaction for the formation of calcium carbonate takes place. The pH value of the reaction mixture is maintained at 8.5–8.6 during the reaction.

The crystalline calcium carbonate which is deposited is discharged from the flask and washed with water until it is free from chloride ions. The product is dried at 100° C. for three hours and yields crystalline calcium carbonate having the properties shown in Table 4 below.

TABLE 4

| Carbonates added | Ammonium carbonate | | Sodium carbonate (comparative) | |
|---|---|---|---|---|
| | 1st run | 2d run | 1st run | 2d run |
| Reaction temperature ° C | 5–6 | 17–18 | 5–6 | 17–18 |
| Yield, percent | 80 | 92.6 | 75 | 90 |
| Apparent density | 0.577 | 0.600 | 0.561 | 0.439 |
| Structure of crystal | (¹) | 0.600 | (²) | 0.439 |
| Grain size range, in microns | 0.8–1.5 | 1–2 | 4–5 | 4–5 |

¹ 70% vaterite plus 30% calcite.
² Calcite.

The experiment results show that the use of ammonium carbonate is necessary to produce crystalline calcium carbonate of the vaterite type.

What we claim is:

1. The process for the production of crystalline calcium carbonate of the vaterite type having a maximum grain size of 5 microns which comprises the steps of: (a) vigorously agitating an aqueous solution of calcium chloride; (b) reacting said solution with gaseous carbon dioxide during the course of said agitating step; (c) maintaining the pH of said solution at a minimum value of 8 said reacting step by the addition of ammonium hydroxide; and (d) maintaining the reaction temperture in the range from 11° to 20° C.

2. The process according to claim 1, in which said pH is maintained in the range from 8.0 to 8.6.

3. The method according to claim 1, comprising the further step of diluting said carbon dioxide with an inert gas to provide a maximum concentration of 10% carbon dioxide during said reacting step.

References Cited by the Examiner

UNITED STATES PATENTS 2,941,860  6/1960  Annis _____ 23—66
2,964,382  12/1960  Hall _____ 23—66

OSCAR R. VERTIZ, *Primary Examiner.*

G. T. OZAKI, *Assistant Examiner.*